US007008322B1

(12) United States Patent
Suzuki et al.

(10) Patent No.: US 7,008,322 B1
(45) Date of Patent: Mar. 7, 2006

(54) IMAGE PROCESSING DEVICE, ELECTRONIC PLAYING DEVICE, AND STORAGE MEDIUM FOR TV GAME MACHINE

(75) Inventors: Yuu Suzuki, Tokyo (JP); Hideaki Miyagushi, Osaka (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 09/700,545

(22) PCT Filed: Mar. 17, 2000

(86) PCT No.: PCT/JP00/01666

§ 371 (c)(1),
(2), (4) Date: Mar. 14, 2001

(87) PCT Pub. No.: WO00/54861

PCT Pub. Date: Sep. 21, 2000

(30) Foreign Application Priority Data

Mar. 18, 1999 (JP) ................................. 11-073326

(51) Int. Cl.
*A63F 13/00* (2006.01)
(52) U.S. Cl. ................................ 463/31; 463/8; 463/36
(58) Field of Classification Search .................... 463/1, 463/30–35; 273/148 B; 434/118, 307 R, 434/308, 309, 258
See application file for complete search history.

(56) References Cited

U.S. PATENT DOCUMENTS

| 4,752,069 | A | * | 6/1988 | Okada .......................... 463/23 |
| 5,049,079 | A | * | 9/1991 | Furtado et al. .............. 434/253 |
| 5,103,498 | A | * | 4/1992 | Lanier et al. ................. 706/58 |
| 5,169,319 | A | * | 12/1992 | Potocki ....................... 434/236 |
| 5,377,997 | A | * | 1/1995 | Wilden et al. ................ 463/43 |
| 5,393,071 | A | * | 2/1995 | Best ............................. 463/35 |
| 5,393,072 | A | | 2/1995 | Best |
| 5,649,861 | A | | 7/1997 | Okano et al. |
| 5,743,744 | A | * | 4/1998 | Cassily et al. .............. 434/258 |
| 6,018,121 | A | * | 1/2000 | Devecka ....................... 84/743 |
| 6,149,523 | A | | 11/2000 | Yamada et al. |
| 6,241,524 | B1 | * | 6/2001 | Aoshima et al. ............ 434/118 |
| 6,296,570 | B1 | * | 10/2001 | Miyamoto et al. ............ 463/30 |
| 6,379,244 | B1 | * | 4/2002 | Sagawa et al. ................ 463/7 |
| 6,425,822 | B1 | * | 7/2002 | Hayashida et al. ............ 463/7 |
| 6,450,888 | B1 | * | 9/2002 | Takase et al. ................. 463/43 |
| 6,488,586 | B1 | * | 12/2002 | Kobayashi et al. ........... 463/43 |

FOREIGN PATENT DOCUMENTS

EP         0 856 340 A       8/1998

(Continued)

OTHER PUBLICATIONS

E. Hirasawa, "Game Music Fun Club: 1 on 1", DTM Magazine, vol. 6, No. 1, (Japan), (Jan. 1, 1999).

(Continued)

*Primary Examiner*—Michael O'Neill
(74) *Attorney, Agent, or Firm*—Finnegan, Henderson, Farabow, Garrett & Dunner, L.L.P.

(57) ABSTRACT

A practice mode can be inserted into an RPG program without giving the player a sense of boredom. Because the distinction between the practice mode and the game is eliminated, the player is not given the sense that the progress of the game is being interrupted and the problem of the player losing interest can be resolved. Also, because of the construction of a new training system wherein training for special moves, that are difficult to remember, is easily stored on the screen, the player can focus on the progress of the game and can have increased interest in the game.

16 Claims, 7 Drawing Sheets

FOREIGN PATENT DOCUMENTS

| | | |
|---|---|---|
| EP | 0 982 055 A | 3/2000 |
| JP | 10-295935 | 11/1998 |
| WO | WO97/32642 | 9/1997 |

OTHER PUBLICATIONS

International Search Report, May 9, 2000.

* cited by examiner

IMAGE PROCESSING DEVICE, ELECTRONIC PLAYING DEVICE, AND STORAGE MEDIUM FOR TV GAME MACHINE

TECHNICAL FIELD

The present invention relates to an image processing apparatus, and more particularly to an image processing apparatus for executing programs for video-game apparatuses.

BACKGROUND ART

In recent years, many simulation games have been provided as the game programs for game apparatuses, particularly home video game devices. The simulation games have the object of allowing a player to compete with other people or the computer, while experiencing action games such as hand-to-hand fighting with characters appearing in the game, and vehicle racing. Especially in simulation games for hand-to-hand fighting, the player can operate a plurality of keys established on the controller in order to provide operating signals to the game device and control the behavior of a character such as a person engaging in hand-to-hand fighting.

Characters such as people have diverse behaviors, and the player can provide specific combat techniques to the displayed object engaged in the game by combining the operations of a plurality of keys. Normally, because the specific key operations require training, existing simulation games include a scene for training in key operations, called "practice mode". The player can enter this mode during or before the start of the action game as he or she desires.

In this practice mode, the type of keys to be operated and the order in which they are operated or pressed are displayed on the screen in a window format. By pressing the keys in the order indicated, the player causes the displayed object, such as a character, to use the corresponding special techniques. When the key operations corresponding to the key operations indicated cannot be made, the displayed object cannot use the special techniques that are the object. The player can practice the key operations until the displayed object can use these techniques.

After a certain amount of practice, the player exits this practice mode and can begin or return to the scene of the action game.

Also, games that develop along a specific story line, called role-playing games, also employ the elements of a simulation game. In these types of games, this simulation mode emerges as the story develops. In these types of games as well, a player can enter practice mode and practice key operations for these special techniques.

When these game programs reach a simulation portion, such as a hand-to-hand fight or competition, as the story is developing, the progress of the story is stopped until the simulation scene is finished.

Here, this story may be considered to be a scenario that is developed under a specific concept, such as a novel.

The image processing apparatuses for these conventional games have the following problems. The mode of key operations for a displayed object to use special techniques is displayed in the form of symbols for the keys to be operated and the order of operation on the game screen, as discussed above.

However, it is not easy to convey that the player remember this arrangement of the symbols after completing the practice mode.

Also, in the role-playing games discussed above, the player must enter practice mode and become accustomed to the key operations to a certain extent, but this may cause stress to the player or cause the player to lose interest because the development of the story is temporarily stopped when a player enters a conventional practice mode during a story-like game.

It is an object of the present invention to provide an image processing apparatus that comprises a new key operation instruction system for showing key operations that are easily remembered by a player.

It is another object of the present invention to provide an image processing apparatus wherein, even if the player selects a key operation training scene in a role-playing game, the player is not stressed out by the story being stopped. Also, it is another object to attain an electronic game apparatus that is provided this image processing apparatus and a storage medium for storing programs that achieve the abovementioned objects.

DISCLOSURE OF THE INVENTION

The present invention is an image processing apparatus comprising image processing means for realizing image processing operations so that special actions can be provided to a displayed object according to key operations by a player; wherein these image processing means comprise prompt processing means for outputting prompts corresponding to special actions of the abovementioned displayed object to the abovementioned to image processing means, with these prompts indicating key operations to the player by output means, such as image display means and voice output means. The prompts may be displayed on the screen in the form of text or images, or output in the form of vocalization separately or along therewith.

When special actions are provided to the displayed object by key operations, those operations are carried out in very different ways depending on whether the player is an expert or beginner and this difference influences the progress of the game.

The operation procedures and so forth for key operations corresponding to special actions are included in the manual or so-called hint books, and a beginner must learn these from the positions of the keys corresponding to the special actions. In the present invention, key operations corresponding to special actions are taught by the prompt processing means in the form of prompts through the output means.

In other words, the operation procedure can be acquired in a manner appropriate to the progress of the game by using the prompt format. The player is thereby not stressed out by the story being stopped.

Also, an operating mode of the abovementioned invention has the abovementioned image processing means including recognizing means for recognizing the key operations of the abovementioned player and determining means for determining whether the key operations by this player match the actions of the displayed object in the abovementioned prompt processing means. A player can thereby confirm whether his or her key operations are correct. In other words, the proficiency of the learned key operation procedures is understood and the special actions that are the strong points of different players become apparent; as a result, the appropriate objectives and scope in the progress of the game vary more and can make the game more interesting.

When the results of the determination by the abovementioned determining means show that the player's key operations are not correct, or rather, do not match the original key operations, repeat prompt processing means display repeat prompts, to repeat the training for key operations or provide advice to correct key operations, on the display means and the proficiency of the key operations can be recognized.

Meanwhile, when the results do match, the abovementioned repeat prompt processing means display prompts praising those key operations or prompts affirming the key operations on the display means. This can provide the player with a sense of security and a sense of mastery. The display showing this agreement or not, as well as the relationship between the plurality of keys operated and the operations, may be displayed on a sub-screen. Because of the display on a sub-screen, the player can perform key operations without looking at the manual or hint book, even if the player does not learn the correspondence between the keys and the actions. Also, the use of the sub-screen allows the display of the key symbols to be made within the game display screen and can prevent the player from losing interest in the game.

Moreover, an operating mode for when the abovementioned type of display is made on the sub-screen may provide the display when there is no match, even when the determination by the determining means is made many times, and without providing the display from the start. In other words, the players may be people who understand without looking at the sub-screen, or people who will never perform well no matter how many times they try.

When the display is provided on a sub-screen from the start, this has the effect of alleviating the differences in level among the abovementioned players and allowing anyone to enjoy playing. However, it is also necessary to let expert players feel sense of mastery at a minimum. In the beginning, therefore, nothing is displayed on the sub-screen and the operating procedures and so forth are displayed on the sub-screen only for people who do not get a match after several attempts. This can resolve the abovementioned antinomic problem. As another mode of embodying the invention, the mode of the displayed key operations may be output as voice, while the prompts are displayed as an image such as text or pictures, instead of the sub-screen display.

When it is necessary to make a plurality of key operations in series, each of those key operations is represented by being shown in a prompt along with the actions of the displayed object, and the player grasps the actions as moving images and understands the key operation procedure. In this case, it becomes possible to provide training in key operations in the form of the progress of the game.

BEST MODE FOR CARRYING OUT THE INVENTION

Figure 1:
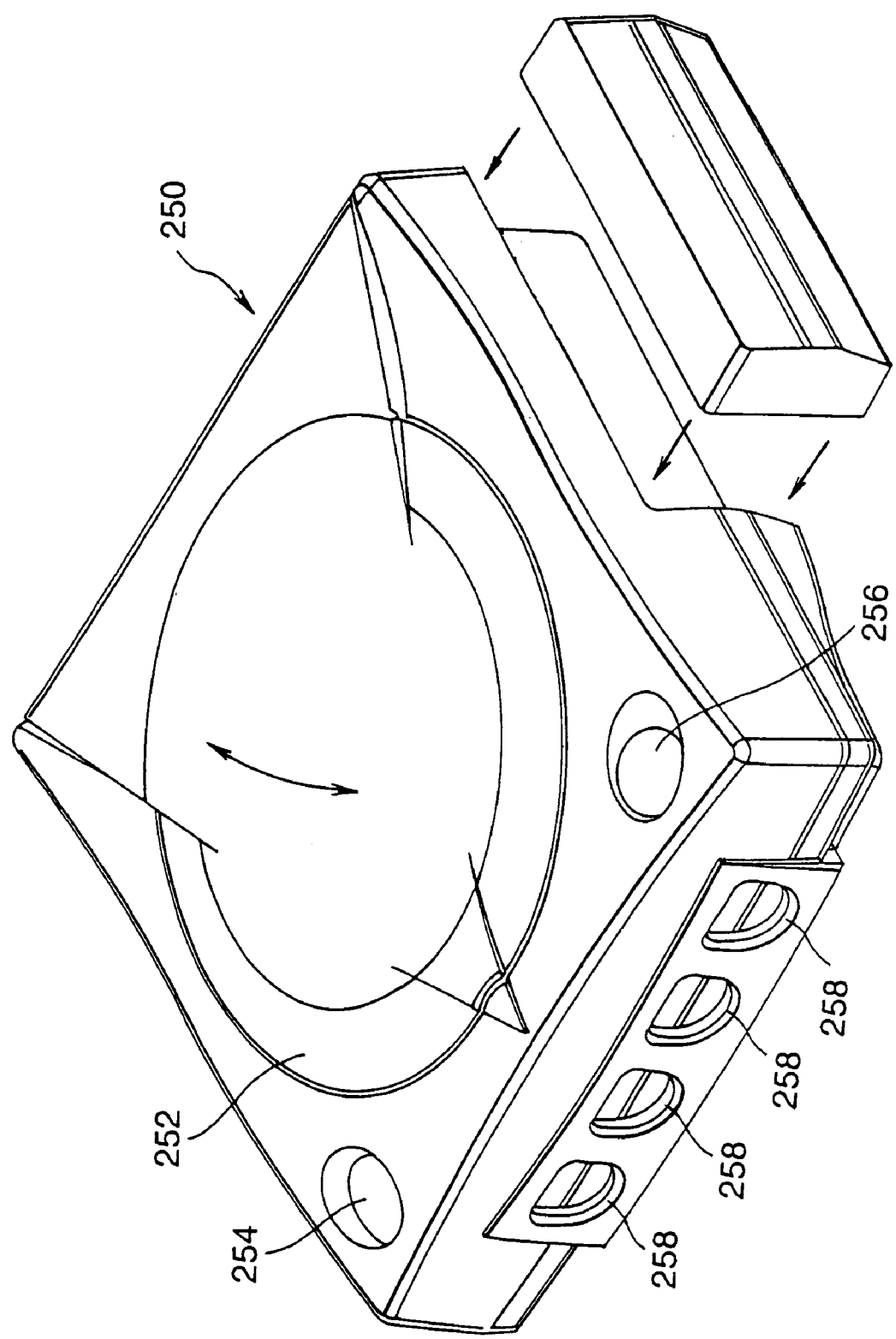
FIG. 1 is a perspective view showing the exterior of the game apparatus to which the image processing apparatus relating to the present invention is applied.

FIG. 1 shows the body of the game apparatus 250 to which the image processing apparatus relating to the present invention is applied.

On the top of the game apparatus 250, a round cover 252 that can be opened and closed is established in the center and a power switch 254 and opening and closing switch 256 are established on either side. The cover 252 has a structure such that it can be opened by pressing the opening and closing switch 256.

When this cover 252 is open, the CD-ROM or the like that is the storage medium for storing the game program can be placed in the game apparatus 250. Moreover, the storage medium may be another medium such as a DVD. This includes telecommunications media such as a server on the Internet or with PC telecommunications.

Four connectors 258 are established on the front side of the game apparatus 250. The connector 240 of the controller 220 (see FIG. 2) discussed below can be connected to these connectors 258. A maximum of four controllers 220 can be connected.

Figure 2:
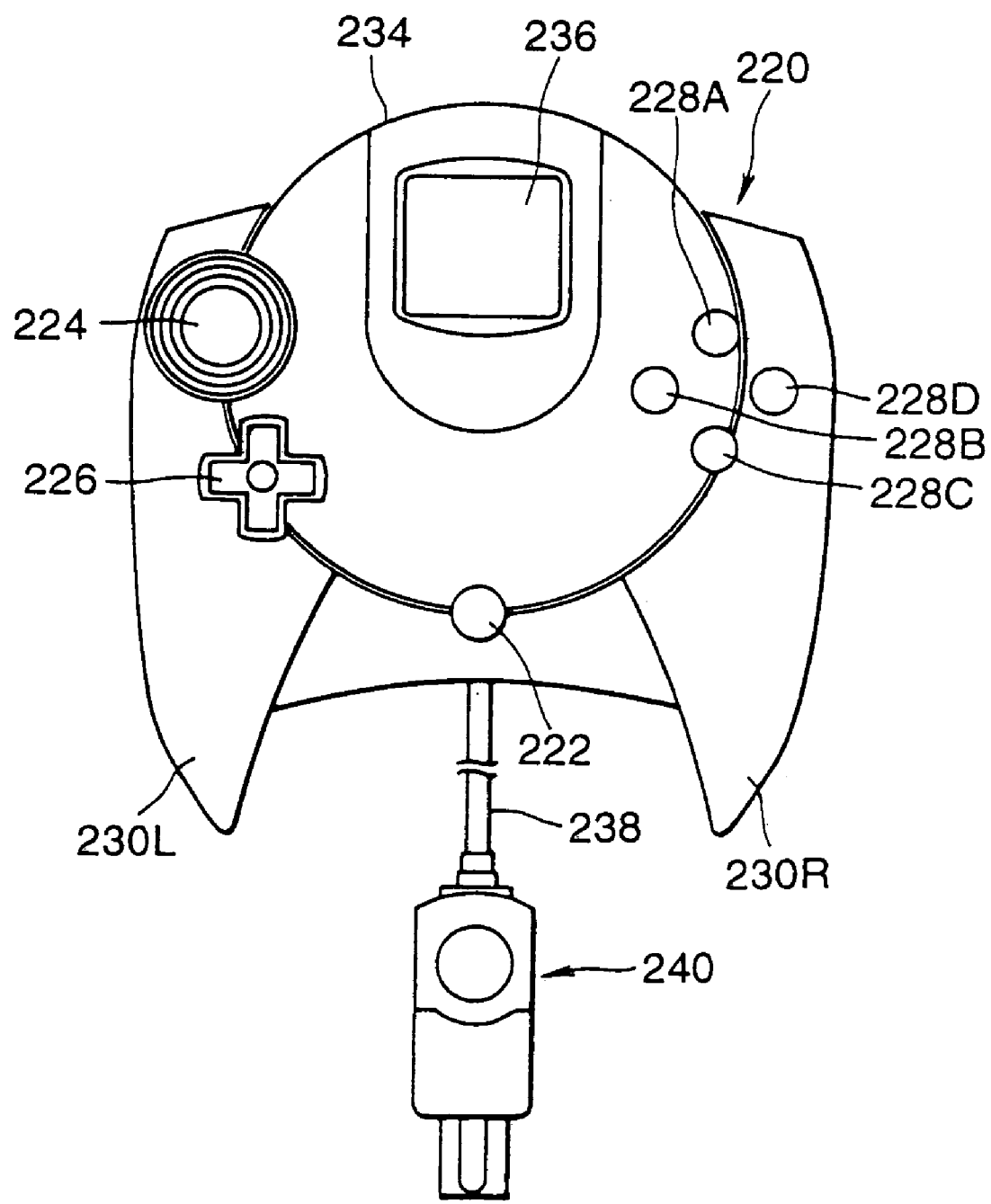
FIG. 2 is a front view of the controller connected to the game apparatus relating to the present embodiment.

As shown in FIG. 2, the controller 220 that can be connected to the abovementioned connector 258 has a start button 222 established in the lower central portion of the top operating panel. Also, an analog direction key 224 and digital direction key 226 for indicating the direction are established on the left side of the top operating panel. Furthermore, four command buttons 228A, 228B, 228C, and 228D are established on the right side of the top operating panel.

Moreover, a left command lever (not shown) is established on the rear operating panel of the handle portion 230L of the controller 220. A right operating lever (not shown) is established on the rear operating panel of the handle portion 230R.

The start button 222 is a command button with which a single command can be input when it is pressed once. This start button 222 is difficult to press frequently because of its location on the lower central portion of the top operating panel and is mainly used for commands that are not necessary during the game, such as the start game command.

The analog direction key 224 is used for so-called analog directional commands, or continuous directional commands that can indicate the direction to travel in 360°. The digital direction key 226 is used for the so-called digital directional commands, or discrete directional commands in only eight predetermined directions. The analog direction key 224 and digital direction key 226 are established on the left side of the top operating panel and the player normally operates these with his or her left thumb.

The command buttons 228A, 228B, 228C, 228D are command buttons that input a single command when pressed once. These command buttons 228A, 228B, 228C, 228D are established on the right side of the top operating panel and the player normally operates these with his or her right thumb.

The left command lever and right command lever, not shown, can input an indicated amount that is changed continuously by pulling the levers towards the player. When the player holds the controller 220 in both hands, the left command lever and right command lever are used for a rotary operation by being pulled towards the player by the fingers near the thumbs, such as the index finger or middle finger, and can send the indicated amount that is changed continuously and corresponds to the angle of the rotary operation.

A slot 234 is established on the upper portion of the controller 220, so that a portable game memory card (referred to below as "memory card", see FIG. 3) 200 discussed below is loaded into this slot. The slot 234 has a two level structure consisting of upper and lower levels and can hold the abovementioned memory card therein (see FIG. 4).

A window 236 is formed in the upper portion of the top operating panel of the controller 220. Part of the memory card 200 inserted in the upper side can be seen therethrough.

The connecting cable 238 of the controller 220 projects towards the player from between the right and left handle portions 230L, 230R. A connector 240 for connecting with the connector 258 on the abovementioned game apparatus 250 is established on the end of this connecting cable 238.

Figure 3:
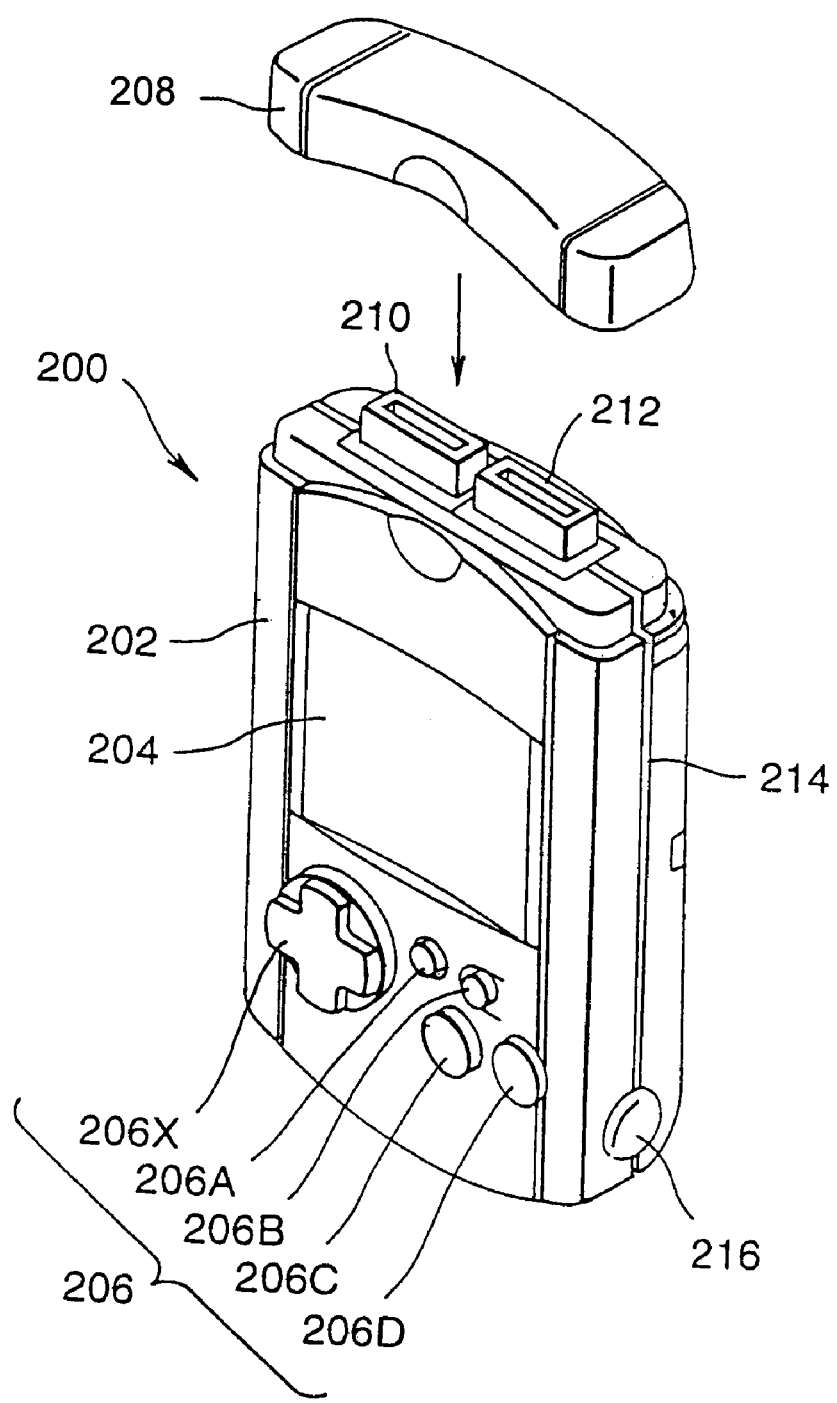
FIG. 3 is a front view of the memory card that can be connected to the game apparatus or controller relating to the present embodiment.

As shown in FIG. 3, the memory card 200 has a small LCD (liquid crystal display) 204 established on the upper portion of the surface of the case 202 and operating buttons 206 established below the LCD 204. A directional key 206X and command buttons 206A, 206B, 206C, and 206D are established as the command buttons 206.

Connectors 210, 212 are established on the top end of the case 200, in other words, above the LCD 204. These are normally hidden by a cover 208. When the memory card 200 is being used independently, the connectors 210, 212 form a male-female pair. By removing the cover 208, these may be connected to another memory card 200.

Figure 4:
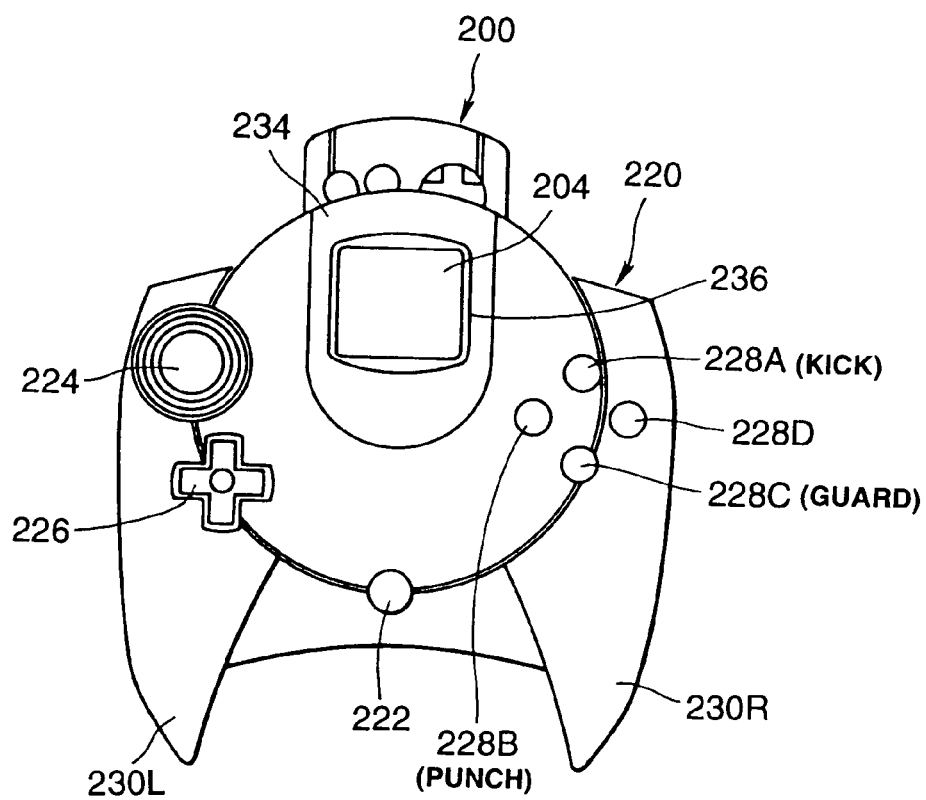
FIG. 4 is a front view showing the memory card installed in the controller.

Guide grooves 214 are established on both sides of the case 202 of the memory card 200. These allow for smooth insertion into the slots 234 of the controller 220 and the game apparatus 250. FIG. 4 shows the memory card inserted into the controller 220. It is recommended that a game relating to the present embodiment be used in this state; the LCD 204 that is exposed through the window 236 is used as the sub-screen.

Finger grips 216 are established on both sides of the case 202 of the memory card 200. A player can remove the memory card 202 by grasping and pulling the finger grips 216.

Figure 5:
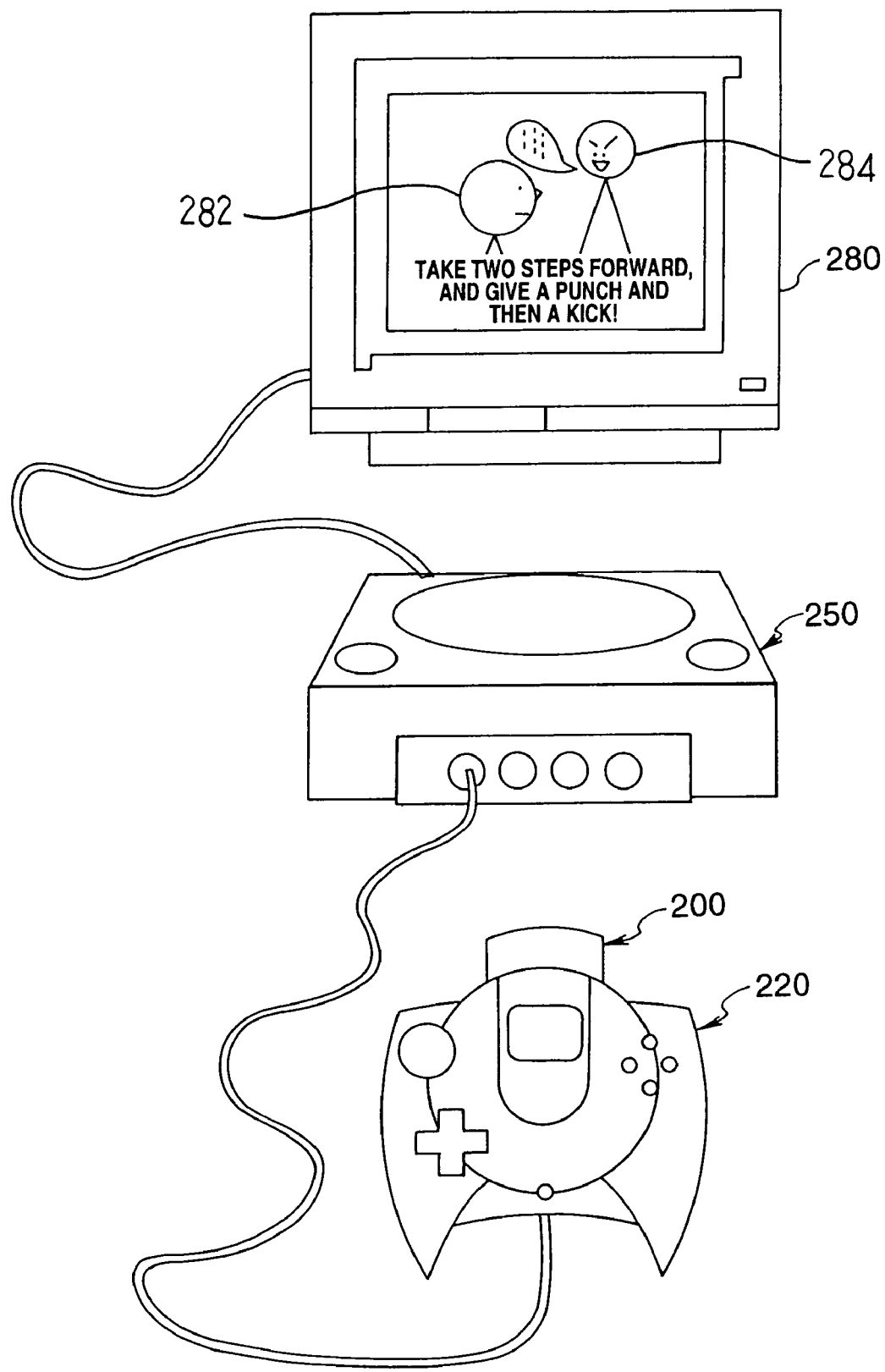
FIG. 5 is a conceptual diagram showing the situation wherein the game apparatus relating to the present embodiment is connected to a monitor and a game is under way.

FIG. 5 shows the game apparatus 250 relating to the present embodiment connected to a home television monitor 280 (referred to as "monitor 280" below).

A scene from the game software stored on the CD-ROM loaded in the game apparatus is displayed on the monitor 280.

In a game to which the present embodiment is applied, a so-called role-playing game (RPG) and competitive game are combined. In such a game, a specific character (protagonist) fights with various other characters (competitors) that appear as the game progresses along a prescribed story line. By winning, the protagonist character acquires advantageous conditions (for example, life points) and achieves the ultimate objective.

This game software includes a so-called practice mode (a training mode for key operation procedures for taking action when competing with competitor characters). This practice mode is actuated by the protagonist character meeting a practice character incorporated in part of a situation from the RPG on the story screen.

In other words, this practice mode can be executed under the same conditions as during the game.

More specifically, as shown on the abovementioned monitor 280, a protagonist character 282 meets the practice character 284, and engages in a prescribed dialogue. The practice mode is started upon selecting Yes in response to a final question as to whether to receive training (Yes/No display on monitor 282).

In this practice mode, prompts for the practice character 284 are displayed on the monitor 280 and may also be combined with voice output. The procedures for the key operations are explained and the actions of the practice character 284 are shown in these prompts. For example, the prompt in FIG. 5 shows "take two steps forward, and give a punch and then a kick!". "Take two steps forward" in this prompt means "press the forward button twice" on the digital direction key 226 as defined in the manual, and "give a punch and then a kick" means "press the punch button (the command on 228A in this case) and then the kick button (command button 228D)" as defined in the manual. The protagonist character 282 can be caused to act by the player performing the corresponding operations. According to the actions of this protagonist character 282, it may also be determined to whether these actions match the techniques being trained.

If the techniques match, a prompt praising the protagonist character 282 is displayed. If they don't match, a prompt to that effect is displayed, along with a corrective prompt showing what was wrong.

Moreover, because the background image of this practice mode is the same as in the RPG, the player can use the practice mode with the sense of continuing the RPG.

In the present embodiment, operation procedures for the operating keys in order to make the techniques being trained are also displayed on the LCD 204 of the abovementioned memory card 200. In other words, the contents displayed on this LCD 204 are used as a help screen appropriate for each situation. For this reason, the player can confirm the operating procedures along with the operating keys used at any time, without looking at the manual or hint book.

The operation of the present embodiment is explained below using the flow charts in FIGS. 6 and 7.

Figure 6:
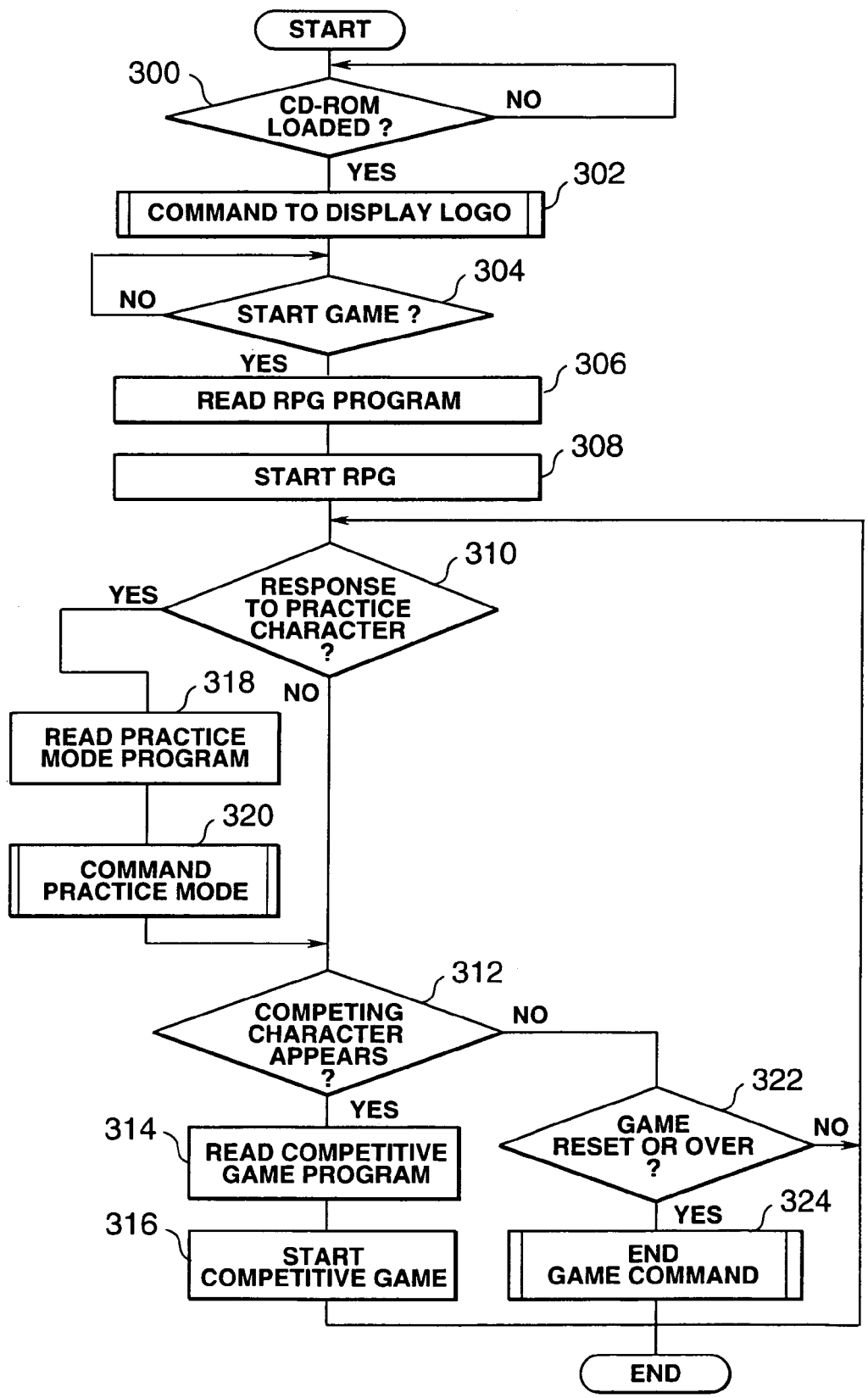
FIG. 6 is a control flowchart showing the progress of the game software applied to the present embodiment.

FIG. 6 shows a control flowchart showing the flow throughout the entire game.

In Step 300, it is determined whether the CD-ROM holding the game software explained in the present embodiment is loaded. When the decision is affirmative, the process moves to step 302, and the reading of the data on the CD-ROM begins and the command to display the logo is made.

When the logo display ends, the process moves from Step 302 to Step 304 and it is determined whether the start button 222 for starting the game has been operated. When the decision in Step 304 is affirmative, the process moves to Step 306, the RPG program that is the basis for this game is read, and then the RPG game is started in Step 308. Accordingly, the game begins and the player can operate the various operating buttons on the controller 220 and play the game. Moreover, when a game in progress up to the present has been stored, this stored information is read at the start of this game and it is possible to restart from the end of the previous play.

While the RPG is progressing, a scene in which the practice character 284 appears and the scene for training special techniques is displayed on the screen.

At this time, the various prompts (for example, the details and effects of the techniques being practiced at this time) for the practice character 284 are output both in voice and on screen and it is asked whether to receive training (Yes/No) (Step 310). At the same time, the text "Yes/No" is displayed on the screen of the monitor 280. The player selects a response by turning the analog direction key 224 on the controller 220 to the right or left and decides Yes or No by operating any of the command buttons 228A, 228B, 228C, 228D.

When No, meaning that training is not necessary, is selected, the game will continue and the process moves to Step 312.

In Step 312, a scene in which competing characters appear occurs in the RPG. When these competing characters appear, the process moves from Step 312 to Step 314, the competitive game program is read, and then a competitive game starts in Step 316.

In this competitive game, the protagonist character actually competes with the competing character. The player operates the various operating buttons on the controller 220 and takes action to fight. In accord with this fight, the life power of each is reduced and the first to lose all life power loses.

In this type of competition, using special techniques (for example, tornado kicks) besides normal punching and kicking can greatly reduce the abovementioned life power and be an advantage. When the competitive game is decided upon in Step 316, the process returns to Step 310.

Next, when Yes is selected in Step 310, the process moves to Step 318 and the practice mode program is read. Then, the practice mode command is executed in Step 320. This practice mode is explained below using FIG. 7.

When the practice mode in Step 320 ends or when the process returns to Step 312 when No is selected in Step 310, the process moves to Step 322 when competing characters are not present and it is determined whether the game is reset or the game is over. In the case of a negative determination, the process returns to Step 310. In the case of an affirmative determination, the process moves to Step 324, commands for ending the game are executed, and the processing ends.

In other words, while the RPG is progressing normally, Step 310, Step 312, and Step 322 are repeated as a basic loop. When competing characters appear, the competition mode is executed; when practice mode is selected, the practice mode is executed; and finally the process returns to the abovementioned basic loop.

Figure 7:
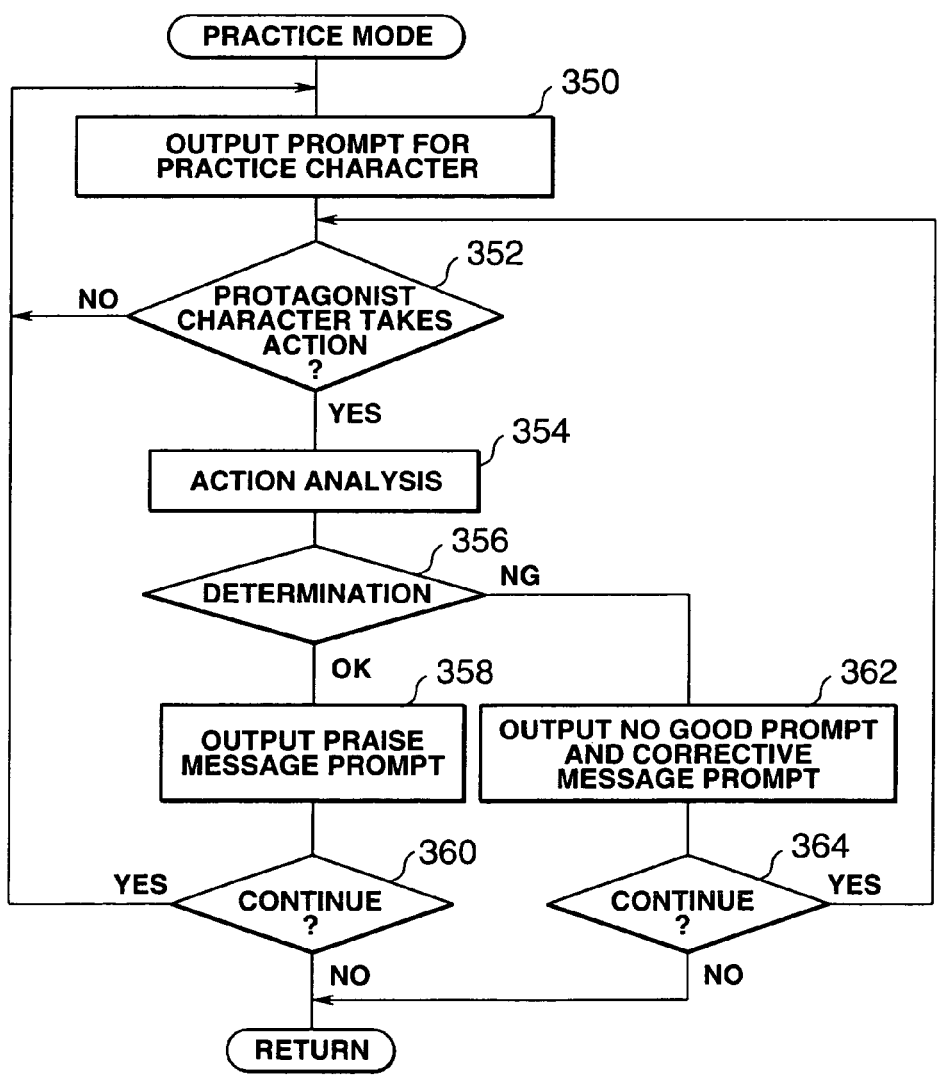
FIG. 7 is a control flowchart showing the practice mode subroutine in the control flowchart in FIG. 6.

Next, the practice mode command routine is explained using FIG. 7.

Upon entering practice mode, the practice character talk to the protagonist character a variety of things (Step 350). Although some of the talks are completely unrelated to the progress of the game, these become very important in increasing the interest of the game.

Also, the operating procedures for special techniques are hidden in these prompts. For example, the following meaning is hidden in the prompt displayed on the monitor 282 in FIG. 5, "Take two steps forward, and give a punch and then a kick".

Specifically, "Take two steps forward" means "Press the forward button twice" on the digital direction key 226 as defined in the manual. "Give a punch and then a kick" means "press the punch button (the command button 228A in this case) and immediately press the kick button (command button 228D)" as defined in the manual.

The player can read (and listen to) these prompts and cause the protagonist character 282 to take action by performing the operations as instructed (Step 352).

In the next Step 354, the actions of the protagonist character 282 are analyzed and then, in Step 356, it is determined whether these actions match the techniques in the training.

If a match results from the determination in Step 356, the process moves to Step 358 and prompts praising the protagonist character 282 are displayed. Next, a decision as to whether to continue in practice mode is prompted in Step 360 and when practice mode is to continue, and the process returns to Step 350. When practice mode is not to continue, the process returns to the routine in FIG. 6.

Meanwhile, when the techniques are found to not match in Step 356, the process goes from Step 356 to Step 362 and a prompt to the effect that the techniques were not good is displayed along with a corrective prompt indicating the problems. Next, a decision as to whether to continue in practice mode is prompted in Step 364 and when practice mode is to continue, the process returns to Step 352. When practice mode is not to continue, the process returns to the routine in FIG. 6.

In this way, practice mode can be executed on a level equivalent to the situations of the RPG as the RPG is in progress. Also, the background images in practice mode are the same as in the RPG, therefore the player can engage in the practice mode with the sense that the RPG is continuing.

In this way, in the present embodiment, the practice mode for the game software, that is prepared as a combination of an RPG program and a competitive game program, can be inserted into the abovementioned RPG program without giving the player a sense of boredom. Because the distinction between the practice mode and the game is eliminated, the player is not given the sense that the progress of the game is being interrupted and the problem of the player losing interest can be resolved.

Also, because of the new training system provided on a screen according to the invention, those special techniques, that are difficult to remember and had to be learned with reference to a hint book, can be easily remembered, and the player is allowed to focus on the progress of the game and can have increased interest in the game.

Moreover, in the present embodiment, training for key operations to use techniques was performed using prompts displayed on the monitor 282, but the key operations and procedures may also be displayed on the LCD 204 of the memory card 200.

The display on this LCD 204 may be carried out either immediately upon entering practice mode, or after a determination of "no good" has been made a predetermined number of times. If the training instructions are displayed on the LCD from the beginning, some players who want to enjoy the training based on the actions on the monitor 280 but are tempted to glance down at the LCD 204, will lose their interest. Therefore, no display is provided on the LCD 204 for the beginning. However, some of the non-expert or unskilled players can mistake the relationship between the action on the screen and the key operations and may not improve no matter how many tries they make. This may hinder the progress of the game and cause the player to lose interest. Therefore, the key operation procedures and so forth are displayed on the LCD 200 for only players who continue to show no improvement and the players can therefore enjoy the game regardless of whether they are expert or non-expert, skillful or unskilled.

Moreover, as a further mode of displaying on the LCD 204, the training instructions may be displayed on the LCD 204 according to the life points or the like of the protagonist character. For example, when the protagonist has many life points, the game will not end even when the protagonist fights with competing characters one or two times. Therefore, training is made difficult (no display on the LCD 204). Meanwhile, when the protagonist has few life points, training is made easy (display on the LCD 204) because the game may end even with one fight with a competing character. Furthermore, the display mode may be a preset default mode.

INDUSTRIAL APPLICABILITY

As explained above, the present invention is a novel system for training key operations, by which a player can learn the key operations easily. It is an effect of this invention that the player is not stressed out by the story of the role-playing game being stopped even when the player selects a scene for training key operations.

What is claimed is:

1. An image processing apparatus comprising:
   prompt processing means for processing a prompt that provides training for a key operation corresponding to a special action of a first character of a game;
   means for presenting the prompt relating to the special action through a dialogue spoken by a second character to the first character, the dialogue being incorporated into a situation from the game and suggesting the key operation corresponding to the special action to a player; and
   determining means for determining whether a key operation by the player correctly matches the key operation corresponding to the special action suggested by the prompt and for generating a result of the determination.

2. The image processing apparatus, according to claim 1, wherein said image processing means further comprises:
   recognition means for recognizing the player key operation.

3. The image processing apparatus, according to claim 2, further comprising repeat prompt processing means for outputting repeat prompts such as corrective advice, suggesting said key operation corresponding to the special action, to said output means in the case where there is no match in the result of the determination by said determining means.

4. The image processing apparatus, according to any of claims 1 through 3, wherein said image processing means displays symbols for a plurality of keys to be operated on a sub-screen, according to the result of the determination by said determining means.

5. The image processing apparatus according to claim 4, wherein said sub-screen display is executed in the case when a match is not affirmed even when said result of the determination by said determining means is generated a plurality of times.

6. The image processing apparatus, according to any of claims 1 through 3, wherein, said key operations corresponding to the special action of the first character comprise a series of operations, and each of said operations in said series is output in said prompt while being shown by an action of the first character.

7. The image processing apparatus according to any of claims 1 through 3, wherein the image processing apparatus is configured as an electronic game apparatus.

8. A video game storage medium that stores program code for executing an image processing method, said medium comprising:
   program code for recognizing a key operation by a player;
   program code for processing a prompt that provides training for a key operation corresponding to a special action of a first character of a game;
   program code for presenting the prompt relating to the special action through a dialogue spoken by a second character to the first character, the dialogue being incorporated into a situation from the game and suggesting the key operation corresponding to the special action to the player; and
   program code for determining whether the key operation by the player correctly matches the key operation corresponding to the special action suggested by the prompt and for generating a result of the determination.

9. The image processing apparatus according to claim 6, wherein said image processing means displays symbols for a plurality of keys to be operated on a sub-screen, according to the result of the determination by said determining means.

10. The image processing apparatus according to claim 9, wherein said sub-screen display is executed in the case when a match is not affirmed even when said result of the determination by said determining means is generated a plurality of times.

11. The image processing apparatus according to claim 7, wherein said image processing means displays symbols for a plurality of keys to be operated on a sub-screen, according to the result of the determination by said determining means.

12. The image processing apparatus according to claim 11, wherein said sub-screen display is executed in the case when a match is not affirmed even when said result of the determination by said determining means is generated a plurality of times.

13. The video game storage medium of claim 8, further comprising:
   program code for displaying symbols for a plurality of keys to be operated on a sub-screen, according to the result of the determination by said program code for determining.

14. The video game storage medium of claim 13 further comprising:
   program code for displaying said sub-screen in the case when a match is not affirmed even when said result of the determination by said program code for determining is generated a plurality of times.

15. An image processing method comprising:
   processing a prompt that provides training for a key operation corresponding to a special action of a first character of a game;
   presenting the prompt relating to the special action through a dialogue spoken by a second character to the first character, the dialogue being incorporated into a situation from the game and suggesting the key operation corresponding to the special action to a player; and
   determining whether a key operation by the player correctly matches the key operation corresponding to the special action suggested by the prompt.

16. The video game storage medium of claim 8, further comprising program code for repeatedly outputting the prompt when the player key operation fails to match the key operation corresponding to the special action suggested by the prompt.

* * * * *